(12) United States Patent
Lu et al.

(10) Patent No.: US 9,215,024 B2
(45) Date of Patent: Dec. 15, 2015

(54) BASE STATION SUBSYSTEM, A RBS PART AND A TMA PART AND METHODS THEREOF FOR SYNCHRONIZING THE RBS PART AND THE TMA PART

(75) Inventors: Shan Lu, Beijing (CN); Yong Shen, Beijing (CN); Youping Su, Solna (SE); Chunhui Zhang, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 338 days.

(21) Appl. No.: 13/882,253

(22) PCT Filed: Dec. 13, 2010

(86) PCT No.: PCT/CN2010/002024
§ 371 (c)(1),
(2), (4) Date: Apr. 29, 2013

(87) PCT Pub. No.: WO2012/079187
PCT Pub. Date: Jun. 21, 2012

(65) Prior Publication Data
US 2013/0215804 A1    Aug. 22, 2013

(51) Int. Cl.
*H04J 3/00* (2006.01)
*H04L 5/14* (2006.01)
*H04J 3/06* (2006.01)
*H04W 56/00* (2009.01)

(52) U.S. Cl.
CPC . *H04J 3/06* (2013.01); *H04W 56/00* (2013.01)

(58) Field of Classification Search
CPC .................................. H04W 88/10; H04J 3/06
USPC ....................................................... 370/280
See application file for complete search history.

(56) References Cited

U.S. PATENT DOCUMENTS

| 7,616,940 | B2 | 11/2009 | Holder et al. |
| 7,656,957 | B2 | 2/2010 | Johnson et al. |
| 2001/0041537 | A1* | 11/2001 | Simonsson et al. .......... 455/67.1 |
| 2002/0012382 | A1* | 1/2002 | Schilling ................ H04B 1/707 375/141 |
| 2004/0062321 | A1* | 4/2004 | Nakamura et al. ............ 375/295 |
| 2006/0270369 | A1* | 11/2006 | Hahm ................ H03M 13/2975 455/130 |
| 2006/0274715 | A1* | 12/2006 | Hahm ................... H04L 1/0051 370/349 |
| 2007/0110055 | A1* | 5/2007 | Fischer ................... H04L 47/10 370/389 |
| 2011/0117901 | A1* | 5/2011 | Li et al. ......................... 455/418 |
| 2012/0176966 | A1* | 7/2012 | Ling ............................. 370/328 |

FOREIGN PATENT DOCUMENTS

| WO | 0158181 A2 | 8/2001 |
| WO | 2008009421 A2 | 1/2008 |

* cited by examiner

*Primary Examiner* — Gerald Smarth
(74) *Attorney, Agent, or Firm* — Coats & Bennett, PLLC (57) ABSTRACT

A base station subsystem (1000), a TMA part (100) and a RBS part (150) of a communication system employing TDD; and respective methods are provided for synchronizing the RBS part of the base station subsystem (1000) with the TMA part (100) The RBS part (150) comprises an RBS modem (160) adapted to generate a switch signal comprising a switch command word, and to further send the switch signal to a TMA modem (110). The TMA modem (110) is adapted to demodulate the switch signal and to compare the switch command word with switch command words stored in a register. When any of the switch command words in the register (111) matches the switch command word of the demodulated switch signal, the TMA modem (110) is configured to generate a control signal for controlling a switch of the TMA part for synchronizing the RBS part (150) with the TMA part.

17 Claims, 9 Drawing Sheets

BASE STATION SUBSYSTEM, A RBS PART AND A TMA PART AND METHODS THEREOF FOR SYNCHRONIZING THE RBS PART AND THE TMA PART

TECHNICAL FIELD

The present invention relates generally to synchronization in a communication system and more particularly, to synchronizing a radio base station part with a tower mounted amplifier part of a base station subsystem of a communication system.

BACKGROUND

A Tower Mounted Amplifier (TMA) is used together with a Radio Base Station (RBS) and together they form, in the context of present description, a base station subsystem. A TMA comprises a Low Noise Amplifier (LNA) mounted as close as practical to one or several antennas of the base station subsystem. A TMA reduces the base transceiver station noise figure and therefore improve its overall sensitivity, in other words the mobile mast is able to receive weak signals.

The TMA used in Frequency Division Duplexing (FDD) based system is usually equipped with a duplexer who separates the transmission signals (TX) and the reception (RX) signals internally. The duplexer provides enough attenuation from transmission to reception in order to protect the LNA.

When the TMA is used in Time Division Duplexing (TDD) based system a circulator is usually provided to isolate the reception path from transmission path. This is necessary since a TDD-based communication system uses the same frequency for both downlink (corresponding to transmission) and uplink (corresponding to reception). However, the circulator cannot itself provide enough protection to the LNA, due to leakage in the circulator. The leakage in the circulator means that some power in the transmission path leaks into the reception path. This leakage may damage the LNA which is located in the reception path. In order to protect the LNA, a switch or a limiter may be placed between the circulator and the LNA in order to protect the LNA in case of high leakage in the circulator during a transmission period.

However, such a solution is associated with some drawbacks. In case a limiter is used to protect the LNA, the loop gain will increase the output inband ripple. In case a switch is used, the switch needs to be synchronized with the switch between downlink and uplink transmissions. In order to be able to synchronize the switch with the RBS, additional signal cable may used. However, it is expensive and it increases operating expenditures (OPEX) of the operator.

Such a solution, disclosed in the published international PCT application number WO2001058181A2, requires the current RBS platform to be modified and it will also increase the cost. Another issue with such a solution is reliability of the Bluetooth interface. There may be difficulties in case the frequency bands that the RBS and Bluetooth Interface use are close and/or are disturbing each other.

SUMMARY

It is an object of the exemplary embodiments of the present invention to address at least some of the problems outlined above. In particular, it is an object to provide a method and a base station subsystem for synchronizing a Radio Base Station (RBS) part and a Tower Mounted Amplifier (TMA) part.

According to an aspect of the exemplary embodiments, the above stated problems are solved by means of a base station subsystem of a communication system employing Time Division Duplex (TDD) for synchronizing an RBS part of the base station subsystem with a TMA part of the base station subsystem. The RBS part comprises an RBS modem adapted to generate a switch signal comprising a switch command word, and to further send the switch signal to a TMA modem of the TMA part. The TMA modem is adapted to demodulate the switch signal and to compare the switch command word of the demodulated switch signal with switch command words stored in a register of the TMA part. When any of the switch command words in the register matches the switch command word of the demodulated switch signal, the TMA modem is configured to generate a control signal for controlling a switch of the TMA part for synchronizing the RBS part with the TMA part of the base station subsystem.

According to another aspect of the exemplary embodiments, the above stated problems are solved by means of a TMA part for a base station subsystem for synchronizing the TMA part with an RBS part of the base station subsystem. The TMA part comprises a TMA modem adapted to receive a switch signal, from an RBS modem in the RBS part, the switch signal comprising a switch command word. The TMA modem is adapted to demodulate the switch signal and to compare the switch command word of the demodulated switch signal with switch command words stored in a register of the TMA part. When any of the switch command words in the register matches the switch command word of the demodulated switch signal, the TMA modem is configured to generate a control signal for controlling a switch of the TMA part for synchronizing the RBS part with the TMA part of the base station subsystem.

According to another aspect of the exemplary embodiments, the above stated problems are, solved by means of RBS part for a base station subsystem for synchronizing a TMA part of the base station subsystem with the RBS part. The RBS part comprises an RBS modem adapted to generate a switch signal comprising a switch command word, and to further send the switch signal to a TMA modem of the TMA part.

According to another aspect of the exemplary embodiments, the above stated problems are solved by means of method in a base station subsystem employing Time Division Duplex, TDD, for synchronizing an RBS part of the base station subsystem with a TMA part of the base station subsystem. The method comprises generating a switch signal in an RBS modem of the RBS part, the switch signal comprising a switch command word, and sending the switch signal to a TMA modem of the TMA part. The method further comprises receiving the switch signal in the TMA modem of the TMA part and demodulating the switch signal. The method further comprises comparing the switch command word of the demodulated switch signal with switch command words stored in a register of the TMA part, and generating a control signal, in the TMA modem, for controlling a switch of the TMA part for synchronizing the RBS part with the TMA part of the base station subsystem when any of the switch command words in the register matches the switch command word of the demodulated switch signal.

According to another aspect of the exemplary embodiments, the above stated problems are solved by means of a method in a TMA part of the base station subsystem. The method comprises receiving a switch signal, from an RBS modem in the RBS part, the switch signal comprising a switch command word, and demodulating the switch signal. The method further comprises comparing the switch command word of the demodulated switch signal with switch command words stored in a register of the TMA part, and generating a control signal, in the TMA modem, for controlling a switch of the TMA part for synchronizing the RBS part with the TMA part of the base station subsystem when any of the switch command words in the register matches the switch command word of the demodulated switch signal.

According to another aspect of the exemplary embodiments, the above stated problems are solved by means of method in a RBS part for a base station subsystem for synchronizing a TMA part of the base station subsystem with the RBS part. The method comprises generating a switch signal comprising a switch command word, in an RBS modem in the RBS part, and sending the switch signal to a TMA modem of the TMA part.

An advantage of the embodiments is, compared to envelope detection, interference on air has no impact on the synchronization of the RBS part and the TMA part. The TMA modem can be made with low hardware material cost.

A further advantage of embodiments is that a Low Noise Amplifier in the TMA part can be efficiently protected from unwanted signal flow and interference by means of the switch.

Yet a further advantage of embodiments is that they are independent of which TDD RBS part is being used. A separate TMA part may be connected to the RBS part and be accurately and automatically synchronized with the RBS part. The switch of the TMA part will be controlled by the switch signals generated in the RBS part. The TMA part employing TDD can work with a TDD-TLE RBS part, a TD-SCDMA (Time Division-Synchronous Code Division Multiple Access) RBS part and other RBS parts employing TDD.

Still other objects and features of the exemplary embodiments will become apparent from the following detailed description in conjunction with the accompanying drawings, attention to be called to the fact, however, that the following drawings are illustrative only, and that various modifications and changes may be made in the specific embodiments illustrated. It should further be understood that the drawings are not necessarily drawn to scale and that, unless otherwise indicated, they are merely intended to conceptually illustrate the structures and procedures described herein.

DETAILED DESCRIPTION

Briefly described, there are provided a base station subsystem, a Radio Base Station (RBS) part and a Tower Mounted Amplifier (TMA) part for a base station subsystem of a communication system employing Time Division Duplex (TDD) for synchronizing the RBS part with the TMA part. A method in a base station subsystem, a method in a RBS part and a TMA part is provided for synchronizing the RBS part with the TMA part.

Figure 1:
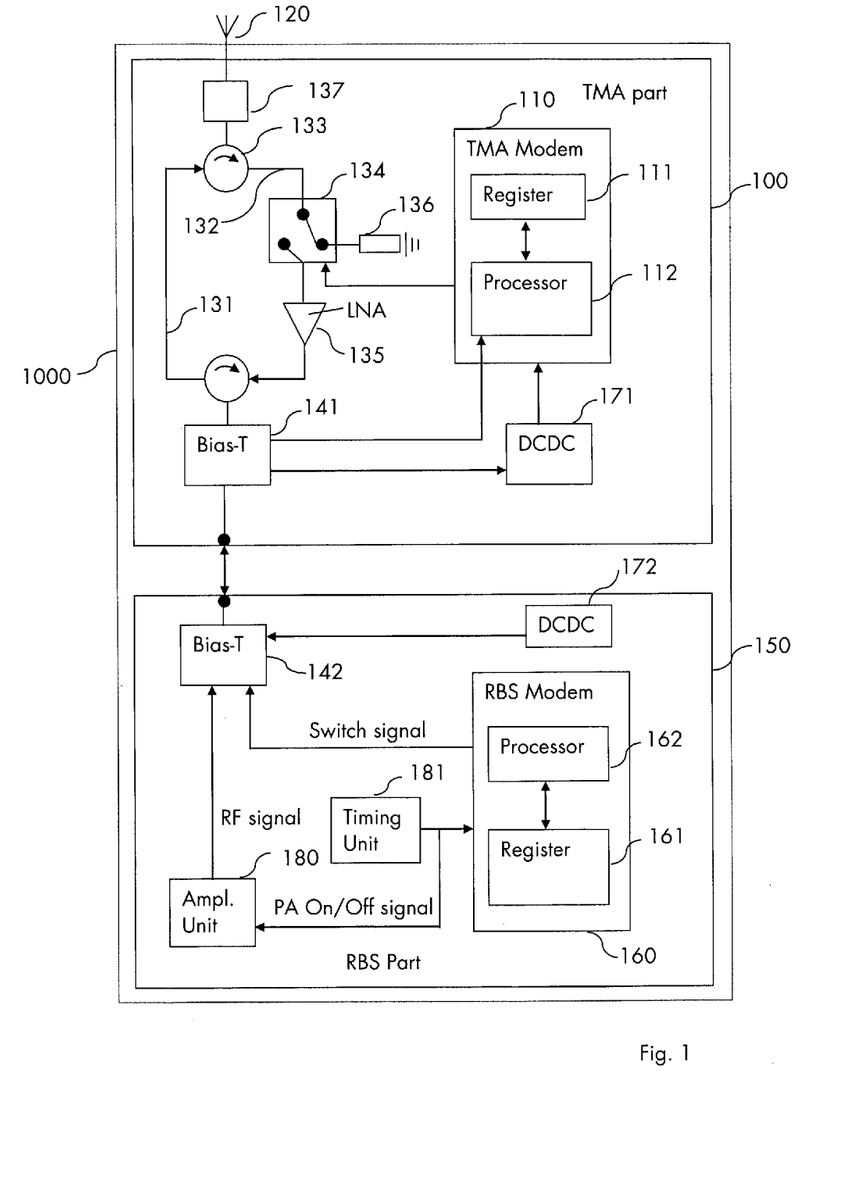
FIG. 1 is a block diagram illustrating a base station subsystem comprising a TMA part and an RBS part in accordance with exemplary embodiments of the present invention.

An exemplifying embodiment of such a base station subsystem will now be described with reference to FIG. 1. As shown, FIG. 1 illustrates a base station subsystem 1000 employing TDD for synchronizing the RBS part 150 of the base station subsystem 1000 with the TMA part 100 of the base station subsystem 1000.

The RBS part 150 comprises an RBS modem 160, which is adapted to generate a switch signal comprising a switch command word. The RBS modem 160 is further adapted to send the switch signal to a TMA modem 110 of the TMA part 100.

The TMA modem 110 is adapted to demodulate the switch signal and to compare the switch command word of the demodulated switch signal with switch command words stored in a register 111 of the TMA part.

When any of the switch command words in the register 111 matches the switch command word of the demodulated switch signal, the TMA modem 110 is configured to generate a control signal for controlling a switch 134 of the TMA part 100 for synchronizing the RBS part 150 with the TMA part 100 of the base station subsystem 1000.

This has several advantages. Compared to envelope detection, interference on air has no impact on the synchronization of the RBS part and the TMA part. The TMA modem 110 may be made with low hardware material cost.

FIG. 1 also illustrates the switch 134 being arranged in a receive path 132 of the TMA part 100 between an antenna 120 and a Low Noise Amplifier, LNA, 135.

By this arrangement, the LNA 135 may be efficiently protected from unwanted signal flow and interference by means of the switch 134.

Further, FIG. 1 illustrates the RBS part 150 comprising a timing unit 181 arranged to control the RBS modem 160 and to control an amplifier unit 180 in the RBS part 150.

The timing unit 181 is arranged to activate a power amplifier in the amplifier unit 180 and simultaneously control the RBS modem 160 to send the switch signal to the TMA modem 110 to control the switch 134 such that the switch 134 connects the antenna 120 with a load resistor 136.

The timing unit 181 is also arranged to inactivate the power amplifier in the amplifier unit 180 and simultaneously control the RBS modem 160 to send the switch signal to the TMA modem 110 to control the switch 134 such that the switch 134 connects the antenna 120 with the LNA 135.

This is illustrated in FIG. 1 by the timing unit 181 sending signals both to the RBS modem 160 and to the amplifier unit 180. In FIG. 1, the timing unit 181 may control the amplifier unit 180 by activating the power amplifier (PA) "PA ON" and simultaneously control the RBS modem 160 to send a switch signal to the TMA modem 110. When the power amplifier is activated, the RBS sends data in downlink towards a mobile station or user equipment (UE). In such a case, the switch 134 shall protect the LNA 135 from any leakage from the circulator 133. This is done by the switch connecting its input from the circulator 133 to a load resistor 136.

Likewise, when the base station subsystem is supposed to receive data in uplink, from a mobile station or UE, the power amplifier should be inactivated as no data is sent in downlink. The timing unit 181 may control the amplifier unit 180 by inactivating the power amplifier (PA) "PA OFF" and simultaneously control the RBS modem 160 to send a switch signal to the TMA modem 110. When the power amplifier is inactivated, the RBS part of the base station subsystem receives data in uplink and in order for the data to be received in the RBS part 150, the switch 134 must connect the antenna 120 to the LNA 135. It shall be pointed out that the circulator 133 is arranged in the path between the antenna 120 and the switch 134 and the LNA 135. When the base station subsystem receives in the uplink, the circulator 133 connects the antenna 120 to the receive path 132. Thereby, the switch 134 is said to connect the antenna 120 to the LNA 135 when the base station subsystem is receiving in uplink. Likewise, when the switch 134 is said to connect the antenna 120 with the resistor 136, the switch 134 connects its input from the circulator 133 to the resistor 136. The leakage signal from transmission path 131 into the receive path 132 due to the circulator may be absorbed by the resistor 136, thereby protecting the LNA 135.

FIG. 1 further illustrates the TMA part and the RBS part coupled together via a Bias-T network 141 and 142. As seen in the figure, also the TMA modem and the RBS modem may be coupled together via the same Bias-T network.

In the exemplifying illustration of a possible TMA part, the TMA part comprises a transmit path 131 and a receive path 132. The TMA part also comprises in this example, a circulator 133 adapted to separate the transmit path from the receive path; and adapted to couple either the transmit path to an antenna 120 or to couple the receive path to the antenna.

The RBS modem 160 comprises a processor 162 adapted to delay the switch signal by a time offset, before sending it towards the TMA modem 110, in order to compensate for the time difference between the propagation delay in the transmission from the power amplifier in the amplifier unit 180 to an output port of the TMA part 100 and the propagation delay in the transmission of the switch signal from the RBS Modem 160 to the TMA Modem 110.

The output port of the TMA part 100 is not shown in FIG. 1, but the output port is located in the TMA part 100 at the connection to the antenna 120 and the TMA part 100 by means of e.g. a short feed cable. There may be several output ports of the TMA part 100 which are coupled to the antenna 120. Although FIG. 1 is merely an illustration, it may still be seen that the path from the amplifier unit 180 to the antenna 120 is different from the path between the RBS modem 160 and the TMA modem 110. As the paths are different, so are the different propagation delays in the transmissions along the different paths. By compensating for the difference in propagation delay, the RBS modem 160 and the TMA modem may be accurately synchronized.

The time offset may be calculated according to the following equation:

$$\text{Offset} = T_{RBS_{modem}} + T_{feeder} + T_{TMA_{modem}} - (T_{TMA} + T_{feeder}) - (T_{PA} + T_{FU}) = T_{RBS_{modem}} + T_{TMA_{modem}} - T_{TMA} - T_{PA} - T$$

In this equation, $T_{RBS_{modem}}$ is the propagation delay for a downlink switch command at the RBS part 150, including FPGA (Field Programmable Gate Array) delay, DAC (Digital to Analog Converter) delay, RF (Radio Frequency) related components delay from DAC to an RBS antenna port (including Bias-T 142). The antenna port is not shown in FIG. 1. However, it may be located at the end of the Bias-T network 142 of the RBS part. The $T_{feeder}$ is feeder delay, which can be seen from the equation is irrelevant. Hence there is no need to compensate for the length of the feeder. The feeder cable is the cable between the RBS part 150 and the TMA part 100, more specifically the cable between the Bias-T 142 of the RBS part and the Bias-T 141 of the TMA part. Further, $T_{TMA_{modem}}$ is the propagation delay for a downlink switch signal at the TMA part including the Bias-T network, a Band Pass Filter (BPF) and ADC (Analog to Digital Converter) and FPGA processing delay. $T_{PA}$ is the delay at the power amplifier in the amplifying unit in the RBS part and $T_{FU}$ is the filter unit delay at RBS part. The filter unit at the RBS part is a BPF in the amplifier unit 180.

Figure 2:
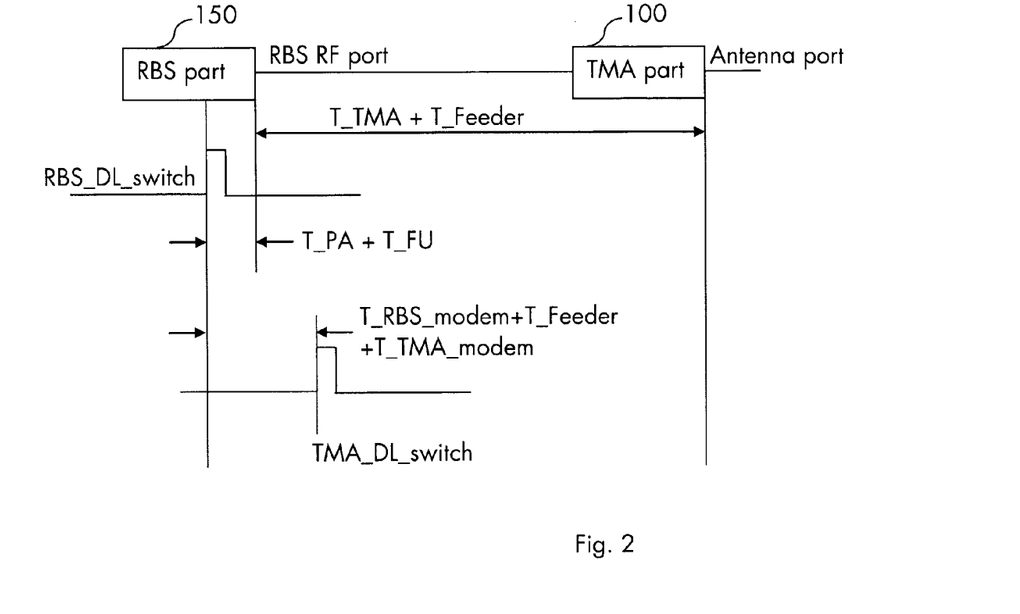
FIG. 2 is an illustration of timing relation with regards to TMA and RBS switch signal.

The different delays are also illustrated in FIG. 2. The parameters may be measured at the production phase and stored in a database at the RBS part 150 and in the TMA part 100.

In an example, the switch signal is modulated in the RBS modem 160 by using Frequency Shift Keying, FSK, or On-Off Keying, OOK.

Figure 3:
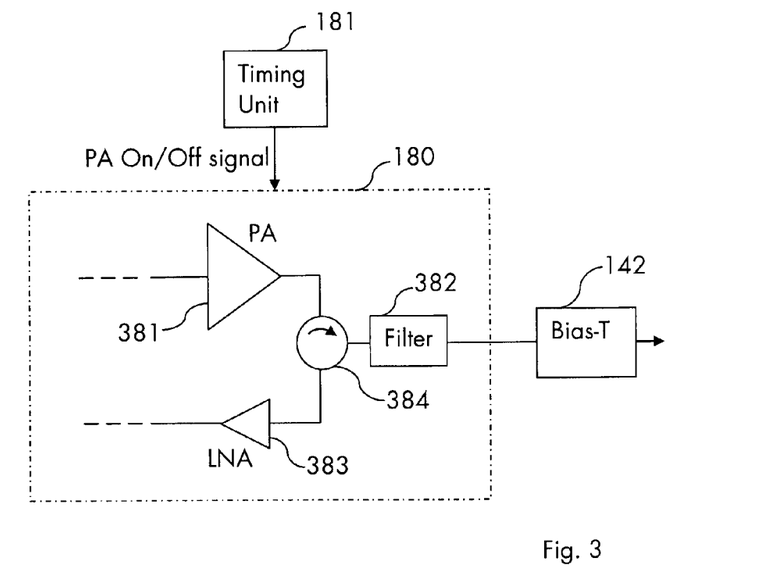
FIG. 3 is a block diagram schematically illustrating an amplifier unit.

FIG. 3 is a block diagram schematically illustrating an amplifier unit 180. The amplifying unit of FIG. 3 is the same as the amplifying unit of FIG. 1, hence the same references are used to denote the same units. Likewise for the timing unit and the Bias-T network of the RBS part. It shall be noted that the amplifier unit 180 illustrated in FIG. 3 is simplified. Other components may be comprised in the amplifier unit. For example, a switch may be arranged between the circulator 384 and the LNA 383. Further, a load resistor may be arranged at the switch in the same manner as in the TMA part in FIG. 1. I.e. the amplifying unit 180 may include a switch, similar to switch 134, and load resistor, similar to load resistor 136, placed between the circulator 384 and the LNA 383.

The amplifying unit 180 further comprises a power amplifier (PA) 381. The PA 381 is activated when the RBS part 150 is transmitting in downlink. FIG. 3 further illustrates the amplifying unit 180 comprising a filter 382.

Again with reference to FIG. 1 and the base station subsystem 1000, the TMA modem 110 is configured according to an exemplifying embodiment to control a supervision timer and a holdup timer. In this embodiment, the TMA modem is configured to update the supervision timer and reset the holdup timer when any of the switch command words in the register 111 matches the switch command word of the demodulated switch signal.

This is also referred to as the normal mode of operation, wherein the TMA modem 110 controls the switch 134 of the TMA part 100 by means of switch signals received from the RBS modem 160 in the RBS part 150, when a switch command word comprised in the switch signal matches a switch command word in the register 111.

A situation may occur, when none of the switch command words in the register 111 matches the switch command word of the demodulated switch signal. If such a situation should occur, the TMA modem 110 is configured to control the switch 134 by means of the supervision timer and to start the holdup timer.

This is also referred to as the holdup mode. In this mode, the TMA modem 110 may not rely on the switch command word comprised in the received switch signal since none of the switch command words in the register 111 matches the switch command word of the demodulated switch signal. The TMA modem then uses the supervision timer in order to control the switch 134. The supervision timer is maintained by the TMA modem as will be explained in more detail later. However, the supervision timer will drift so that it may only be relied on for a certain period of time before it has drifted too much to be used to control the switch 134. In order to keep track of the period of time when the supervision timer may be relied on to control the switch, the holdup timer is started. The holdup mode will be described in more detail below with reference to FIG. 10.

The TMA modem 110 is configured to control the switch 134 by means of the supervision timer either until the holdup timer expires, wherein the TMA modem 110 is configured to send an alarm to the RBS modem 160, or until a switch signal is received comprising a switch command word matching any of the switch command words in the register 111, wherein the TMA modem 110 is configured to generate a control signal for controlling the switch 134 of the TMA part for synchronizing the RBS part 150 with the TMA part 100 of the base station subsystem 1000 and to update the supervision timer and reset the holdup timer.

In the example that the holdup timer expires, the supervision timer may have drifted too much in order to control the switch 134 of the TMA part 100. Then the TMA modem sends an alarm to the RBS modem 160 so that the RBS modem may send a switch signal comprising a switch command word. In this manner, the RBS part 150 and the TMA part 100 may be synchronized again.

In the example that a switch signal is received comprising a switch command word matching any of the switch command words in the register 111, the TMA modem may again rely on the RBS modem and the RBS part 150 and the TMA part 100 of the base station subsystem 1000 may be synchronized. Then, the TMA modem 110 updates the supervision timer and resets the holdup timer. The TMA modem 110 will again operate in the normal mode.

As mentioned before, an exemplifying embodiment of a TMA part for a base station subsystem of a communication system employing TDD for synchronizing a RBS part with the TMA part is shown in FIG. 1 and will now be described with reference again to FIG. 1.

The TMA part 100 comprises a TMA modem 110 adapted to receive a switch signal, from an RBS modem 160 in the RBS part 150, the switch signal comprising a switch command word. The TMA modem 110 is also adapted to demodulate the switch signal and to compare the switch command word of the demodulated switch signal with switch command words stored in a register 111 of the TMA part. When any of the switch command words in the register 111 matches the switch command word of the demodulated switch signal, the TMA modem 110 is configured to generate a control signal for controlling a switch 134 of the TMA part for synchronizing the RBS part 150 with the TMA part 100 of the base station subsystem 1000.

FIG. 1 also illustrates the switch 134 being arranged in a receive path 132 of the TMA part 100 between an antenna 120 and a LNA 135.

This has the advantage that the TMA part may be manufactured separately and connected to an existing RBS part. Since the switch 134 is completely controlled by the switch command generated in the RBS part, the TMA part 100 may be operated together with TD-SCDMA (Time Division-Synchronous Code Division Multiple Access), TDD-LTE (TDD-Long Term Evolution) radio base stations, Wimax or any other suitable TDD-based radio base station.

According to an exemplifying embodiment of the TMA part 100, the TMA modem 110 is configured to control a supervision timer and a holdup timer, wherein the TMA modem is configured to update the supervision timer and reset the holdup timer when any of the switch command words in the register 111 matches the switch command word of the demodulated switch signal.

According to an exemplifying embodiment, the TMA modem 110 is configured to control the switch 134 by means of the supervision timer and to start the holdup timer when none of the switch command words in the register 111 matches the switch command word of the demodulated switch signal.

According to yet an exemplifying embodiment, the TMA modem 110 is configured to control the switch 134 by means of the supervision timer either until the holdup timer expires, wherein the TMA modem 110 is configured to send an alarm to the RBS modem 160, or until a switch signal is received comprising a switch command word matching any of the switch command words in the register 111, wherein the TMA modem 110 is configured to generate a control signal for controlling the switch 134 of the TMA part for synchronizing the RBS part 150 with the TMA part 100 of the base station subsystem 1000 and to update the supervision timer and reset the holdup timer.

Again, FIG. 1 illustrates the RBS part 150 for a base station subsystem 1000 for synchronizing the TMA part 100 of the base station subsystem 1000 with the RBS part 150, the RBS part 150 comprising an RBS modem 160 adapted to generate a switch signal comprising a switch command word, and to further send the switch signal to a TMA modem 110 of the TMA part 100.

The RBS part 150 also comprises a timing unit 181 arranged to control the RBS modem 160 and to control a power amplifier in an amplifier unit 180 in the RBS part 150.

In an example of the RBS part 150, the timing unit 181 is arranged to activate the power amplifier in the amplifier unit 180 and simultaneously control the RBS modem 160 to send a switch signal to the TMA modem 110 to control the switch 134 such that the switch 134 connects the antenna 120 DL leakage signal with a load resistor 136. In this manner, any signal power leaking in the circulator 133 from the transmit path 131 to the receive path 132 is directed towards the load resistor 136, thereby protecting the LNA 135.

In yet an example of the RBS part 150, the timing unit 181 is arranged to inactivate the power amplifier in the amplifier unit 180 and simultaneously control the RBS modem 160 to send a switch signal to the TMA modem 110 to control the switch 134 such that the switch 134 connects the antenna 120 with an LNA 135.

As illustrated in FIG. 1, the RBS part 150 comprises a processor 162 adapted to delay the switch signal by a time offset, before sending it towards the TMA modem 110, in order to compensate for the time difference between the propagation delay in the transmission from the power amplifier in the amplifier unit 180 to an output port of the TMA part 100 and the propagation delay in the transmission of the switch signal from the RBS Modem 160 to the TMA Modem 110.

Figure 4:
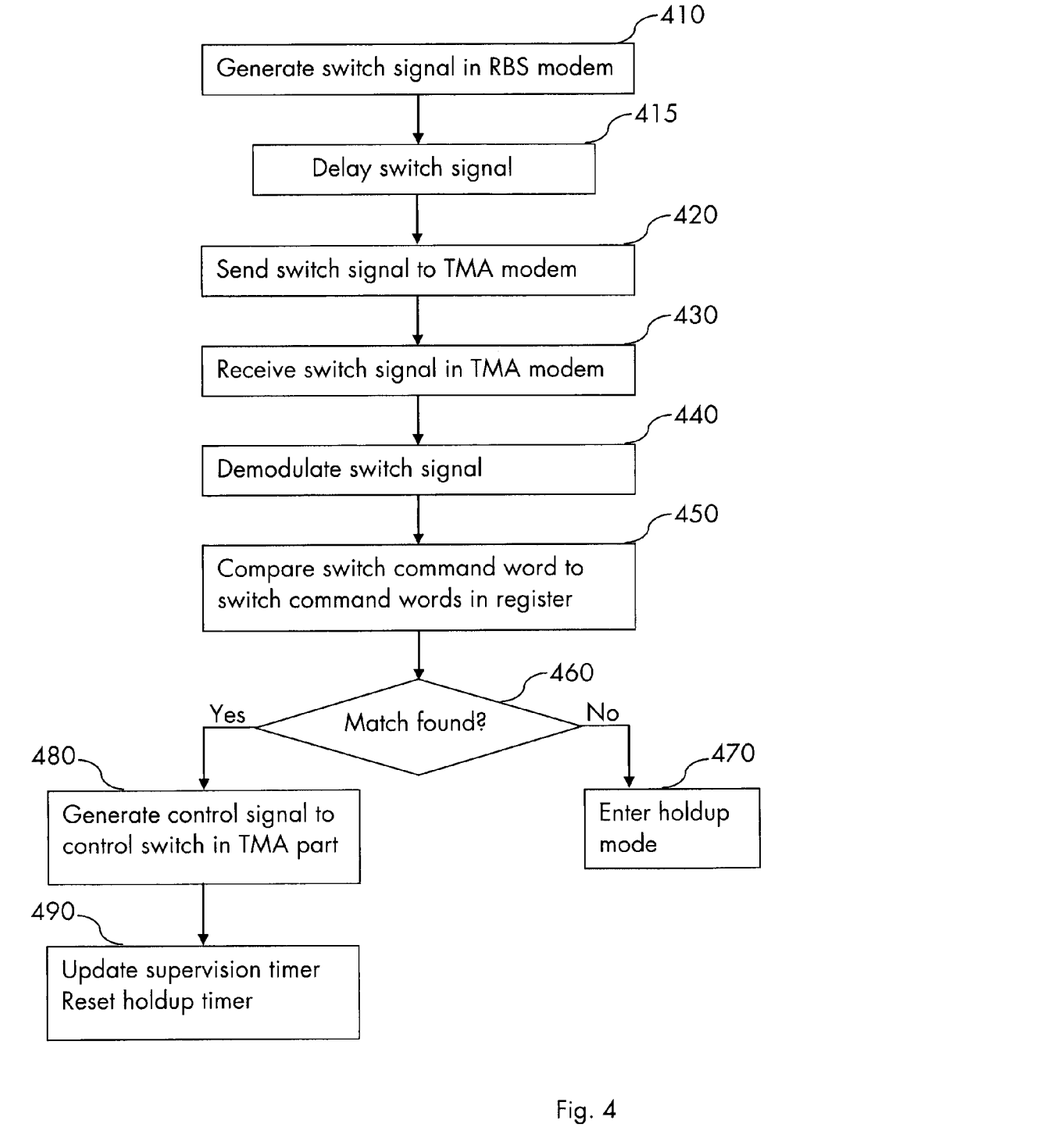
FIG. 4 is a flowchart illustrating an exemplifying method in a base station subsystem for synchronizing an RBS part with a TMA part in accordance with exemplary embodiments of the present invention.

FIG. 4 is a flowchart illustrating an exemplifying method in a base station subsystem for synchronizing a RBS part with a TMA part. The base station subsystem is adapted to be used in a communication system employing TDD.

FIG. 4 illustrates the exemplifying method comprising generating 410 a switch signal in an RBS modem of the RBS part, the switch signal comprising a switch command word, and sending 420 the switch signal to a TMA modem of the TMA part.

The method further comprises receiving 430 the switch signal in the TMA modem of the TMA part and demodulating 440 the switch signal. Further, the method comprises comparing 450 the switch command word of the demodulated switch signal with switch command words stored in a register of the TMA part. If a match is found 460 between any of the switch command words in the register and the switch command word of the demodulated switch signal, then the method comprises generating 480 a control signal, in the TMA modem for controlling a switch of the TMA part for synchronizing the RBS part with the TMA part of the base station subsystem.

According to an exemplifying embodiment, a timing unit controls the RBS modem and a power amplifier in an amplifier unit in the RBS part.

In an example, the power amplifier in the amplifier unit is activated by the timing unit, and wherein the RBS modem is simultaneously controlled by the timing unit to send a switch signal to the TMA modem to control the switch such that the switch connects the antenna with a load resistor. This diverts possible leakage from the circulator into the receive path to the load resistor. In this way, the LNA is protected.

In yet an example, the power amplifier in the amplifier unit is inactivated by the timing unit, and wherein the RBS modem is simultaneously controlled by the timing unit to send a switch signal to the TMA modem to control the switch such that the switch connects the antenna with an LNA.

According to an exemplifying embodiment, the method further comprises delaying 415 the switch signal by a time offset in the RBS modem before sending 420 the switch signal towards the TMA part in order to compensate for the time difference between the propagation delay in the transmission from said the amplifier in the amplifier unit to an output port of the TMA part and the propagation delay in the transmission of the switch signal from the RBS Modem to the TMA Modem.

According to yet an exemplifying embodiment, the method further comprises the TMA modem controlling 490 a supervision timer and a holdup timer, wherein the supervision timer is updated and the holdup timer is reset when any of the switch command words in the register matches the switch command word of the demodulated switch signal.

In an example, the TMA modem controls the switch by means of the supervision timer and starts the holdup timer when none of the switch command words in the register matches the switch command word of the demodulated switch signal.

This is illustrated in FIG. 4 by checking 460 if a match is found in the register and if not, the TMA modem enters holdup mode 470. The holdup mode will be described in more detail below with reference to FIG. 10.

According to an embodiment, the TMA controls the switch by means of the supervision timer either until the holdup timer expires, wherein the TMA modem sends an alarm to the RBS modem, or until the TMA modem receives a switch signal comprising a switch command word matching any of the switch command words in the register, wherein the TMA modem generates a control signal for controlling the switch of the TMA part for synchronizing the RBS part with the TMA part of the base station subsystem and updates the supervision timer and resets the holdup timer.

Figure 5:
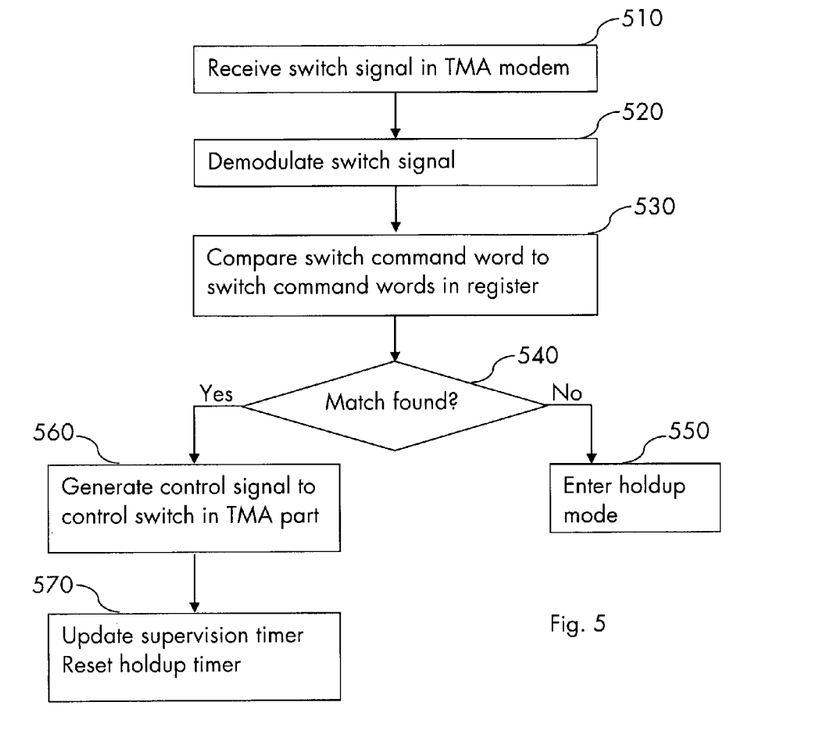
FIG. 5 is a flowchart illustrating an exemplifying method in a TMA part for a base station subsystem for synchronizing a RBS part with the TMA part in accordance with exemplary embodiments of the present invention.

FIG. 5 is a flowchart illustrating an exemplifying method in the TMA part for synchronizing a Radio Base Station part with the TMA part.

As shown the method comprises receiving 510 a switch signal, from an RBS modem in the RBS part, the switch signal comprising a switch command word and demodulating 520 the switch signal.

Further, the method comprises comparing 530 the switch command word of the demodulated switch signal with switch command words stored in a register of the TMA part. If a match is found 540 between any of the switch command words in the register and the switch command word of the demodulated switch signal, then the method comprises generating 560 a control signal, in the TMA modem for controlling a switch of the TMA part for synchronizing the RBS part with the TMA part of the base station subsystem.

The method further comprises the TMA modem controlling 570 a supervision timer and a holdup timer, wherein the supervision timer is updated and the holdup timer is reset when any of the switch command words in the register matches the switch command word of the demodulated switch signal.

If a match is not found in 540, i.e. when none of the switch command words in the register matches the switch command word in the demodulated signal, the TMA modem controls the switch by means of the supervision timer and starts the holdup timer.

This is illustrated in FIG. 5 by the TMA modem entering holdup mode 550.

According to an embodiment, the switch is controlled by means of the supervision timer either until the holdup timer expires, wherein the TMA modem sends an alarm to the RBS modem, or until a switch signal is received comprising a switch command word matching any of the switch command words in the register, wherein the TMA modem generates a control signal for controlling the switch of the TMA part for synchronizing the RBS part with the TMA part of the base station subsystem and updates the supervision timer and resets the holdup timer.

Figure 6:
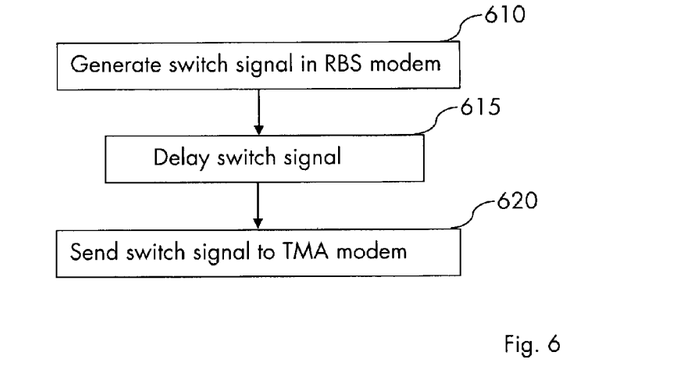
FIG. 6 is a flowchart illustrating an exemplifying method in a RBS part for a base station subsystem for synchronizing the RBS part with a TMA part in accordance with exemplary embodiments of the present invention.

FIG. 6 is a flowchart illustrating an exemplifying method in the RBS part for a base station subsystem for synchronizing the RBS part with a TMA part.

As shown, the method comprises generating 610 a switch signal comprising a switch command word, in an RBS modem in the RBS part and then sending 620 the switch signal to a TMA modem of the TMA part.

In an example, a timing unit controls the RBS modem and a power amplifier in an amplifier unit in the RBS part.

In an example, the power amplifier in the amplifier unit is activated by the timing unit, and wherein the RBS modem is simultaneously controlled by the timing unit to send a switch signal to the TMA modem to control the switch such that the switch connects the antenna with a load resistor.

In yet an example, the power amplifier in the amplifier unit is inactivated by the timing unit, and wherein the RBS modem is simultaneously controlled by the timing unit to send a switch signal to the TMA modem to control the switch such that the switch connects the antenna with an LNA.

FIG. 6 also illustrates an exemplifying embodiment, wherein the method further comprises delaying 615 the switch signal by a time offset in the RBS modem before sending 620 the switch signal towards the TMA part in order to compensate for the time difference between the propagation delay in the transmission from said the amplifier in the amplifier unit to an output port of the TMA part and the propagation delay in the transmission of the switch signal from the RBS Modem to the TMA Modem.

Figure 7:
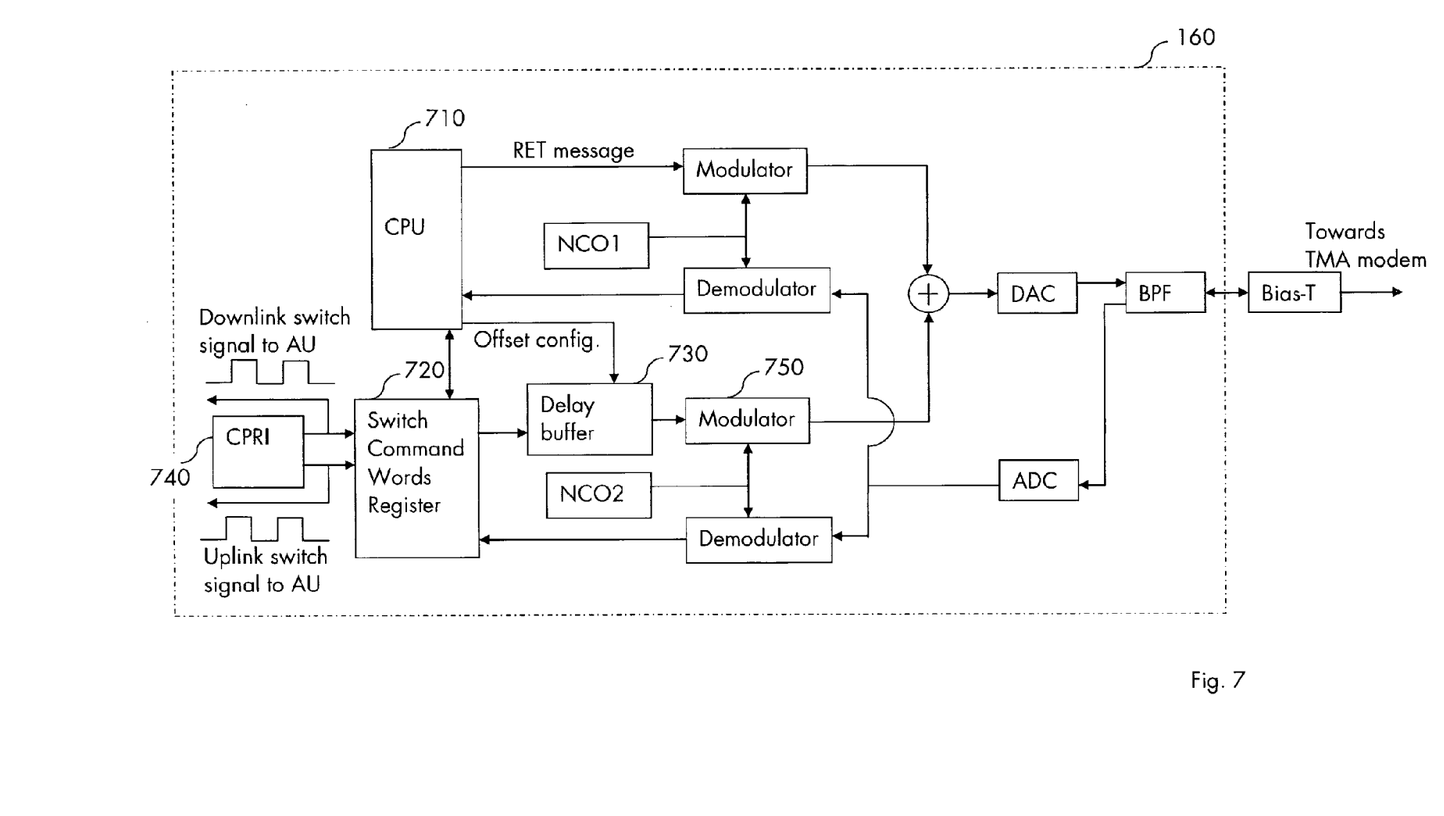
FIG. 7 is a block diagram illustrating an exemplifying RBS modem.

An example of an RBS modem will now be briefly described with reference to FIG. 7 which is a block diagram illustrating an exemplifying RBS modem. FIG. 7 illustrates several components and/or units. For simplicity reasons, not all will be described here.

FIG. 7 shows the RBS modem 160 comprising a register 720 comprising command words. These command words are used to control the switch 134 (illustrated in FIG. 1) such that the base station subsystem may send in downlink and receive in uplink. One example of such a register 720 is a FPGA register.

The RBS modem also comprises a CPRI (Common Public Radio Interface) unit 740. The CPRI unit 740 comprises in this example the timing unit 181 (illustrated in FIG. 1). In the exemplifying block diagram of FIG. 1, the timing unit 181 and the RBS modem 160 are illustrated as separate units. In the exemplifying block diagram of FIG. 7, the timing unit is incorporated into the CPRI unit 740.

FIG. 7 illustrates switch commands being sent via the CPRI unit 740 to the AU, which represents the amplifying unit (AU) 180 as illustrated in FIG. 1. Also switch signals comprising the switch command words are sent towards the TMA modem.

The switch command from the CPRI unit 740 will trigger the RBS modem 160 to send a switch signal comprising a switch command word to the TMA modem. As was described above, the switch signal may be delayed by an offset, before sending it towards the TMA modem, in order to compensate for the time difference between the propagation delay in the transmission from the power amplifier in the amplifier unit to an output port of the TMA part and the propagation delay in the transmission of the switch signal from the RBS Modem to the TMA Modem. For this purpose, the RBS modem 160 is provided with a delay buffer 730, which delays the switch signal accordingly. The time offset may be configured by Layer 3 message.

As was also described above, the signal may be modulated before it is sent to the TMA modem in the TMA part. For this purpose, the RBS modem is provided with a modulator 750. Thereafter the switch signal may be sent to the TMA modem via the Bias-T network.

As can be seen in FIG. 7, the CPU or processor 710 sends an RET message which will also be modulated to a predefined frequency point using NCO1, Numeric Control Oscillator. The NCO1 has a lower frequency than NCO2 resulting in the RET messages being modulated at lower frequencies than the switch signals being modulated using NCO2. Therefore, the RET message will not be affected. RET messages are used to antenna tilt angle control.

The reason to use another higher frequency is to have a high accuracy of the switch signal at the TMA part. The accuracy should be in the interval of microseconds. A possible bandwidth to use is in the MHZ range to transmit the switch signal comprising the switch command word.

Figure 8:
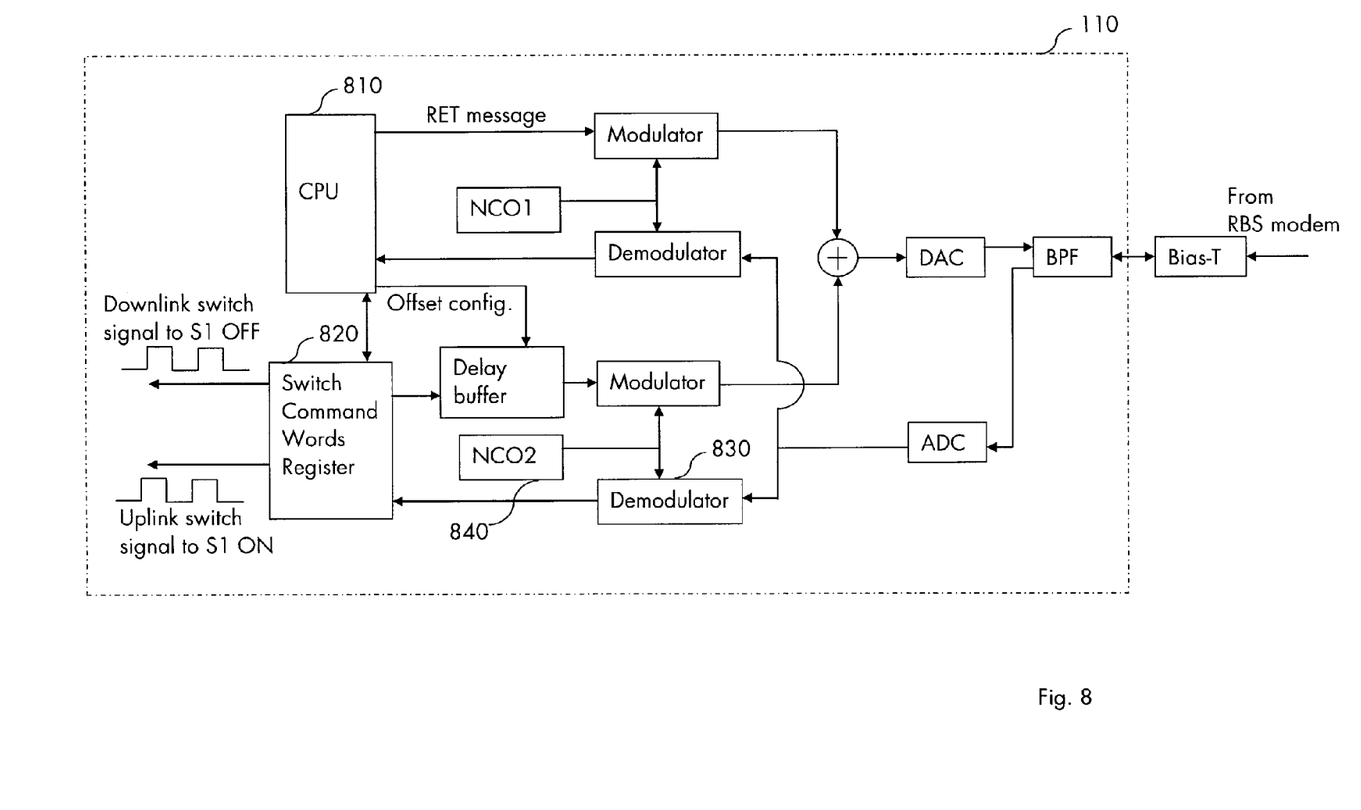
FIG. 8 is a block diagram illustrating an exemplifying TMA modem.

An example of a TMA modem will now be briefly described with reference to FIG. 8 which is a block diagram illustrating an exemplifying TMA modem. FIG. 8 illustrates several components and/or units. For simplicity reasons, not all will be described here.

FIG. 8 shows the TMA modem 110 comprising a register 820 comprising command words. One example of such a register 820 is an FPGA register. FIG. 8 also illustrates the register 820 controlling a switch denoted S1 in FIG. 8 corresponding to the switch 134 illustrated in FIG. 1. In FIG. 8, the register control the switch to be set to OFF for downlink and ON for uplink. Looking at FIG. 1, this corresponds to the switch 134 coupling the antenna 120 to the load resistor 134 for OFF for downlink. Likewise, ON for uplink in FIG. 8 corresponds to the switch 134 in FIG. 1 to couple the antenna 120 to the LNA 135.

FIG. 8 also illustrates the TMA modem 110 comprising a demodulator 830 for demodulating a received switch signal from the RBS modem. After demodulation, the switch command word comprised in the switch signal is compared to switch command words in the register 820. If a match is found, as described earlier, between a switch command word in the register 820 and the switch command word comprised in the switch signal, the TMA modem will control the switch (S1 in FIG. 8) to either be OFF for downlink or ON for uplink.

FIG. 8 also illustrates the TMA modem comprising a NCO2 840 which is a Numeric Control Oscillator. This NCO2 is configured to generate the supervision timer. The NCO2 in turn comes from a local VCXO (not shown), the VCXO being a Voltage Controlled Crystal Oscillator.

Figure 9:
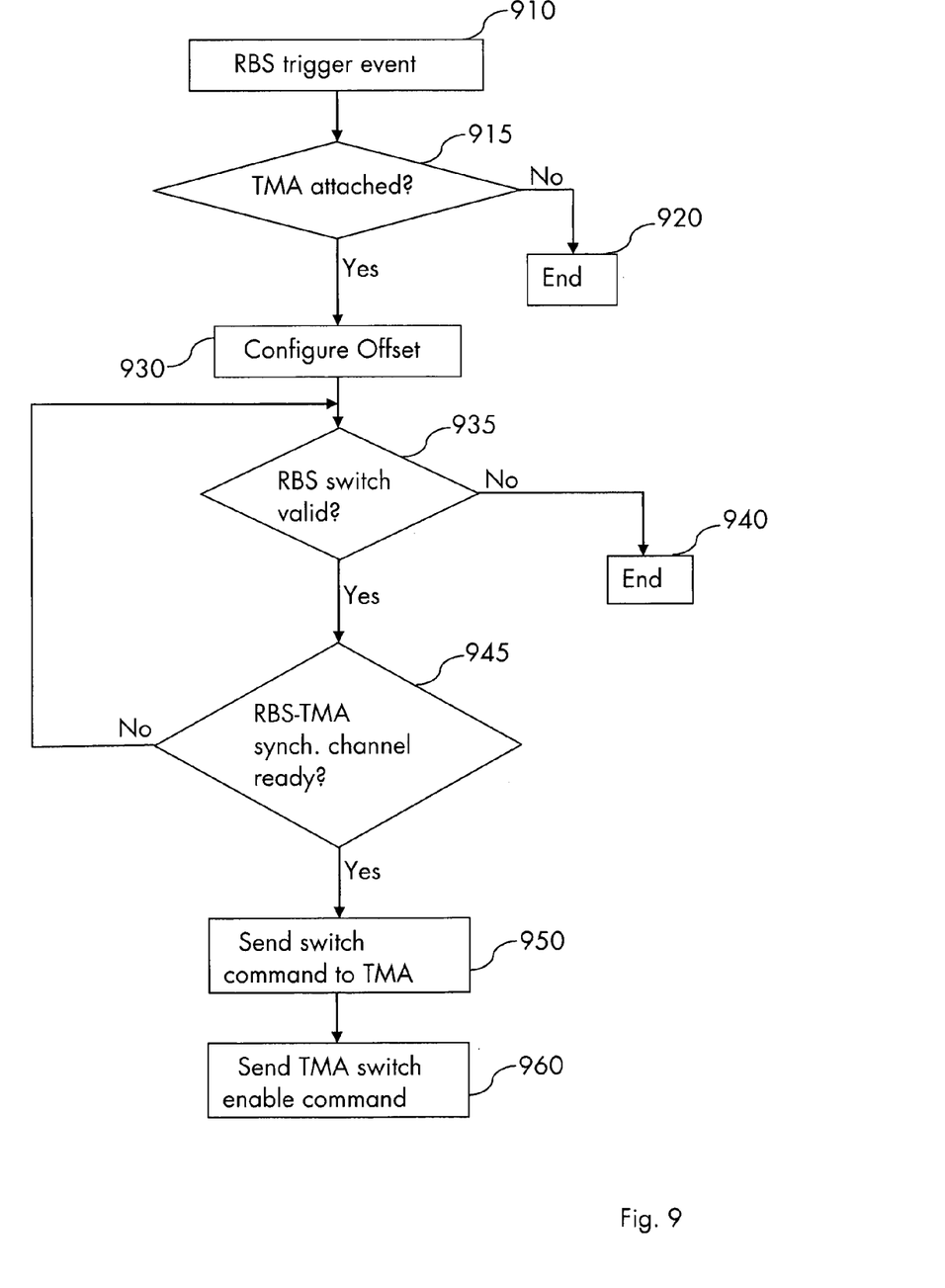
FIG. 9 is a flowchart of an exemplifying synchronization procedure for synchronizing a TMA part with an RBS part.

Now an exemplary synchronization procedure for synchronizing a TMA part with a RBS part at start up of a base station subsystem will be described, with reference to FIG. 9.

In order to make the TMA part timing synchronized with the RBS part, the signaling between the RBS part and the TMA part is, in this example, needed before the switch of the TMA may function. By default, the switch in the receive path comprising the switch (S1 in FIGS. 8 and 134 in FIG. 1) and LNA 135 are both set to OFF, meaning that it is set for downlink transmission to protect LNA 135.

The procedure starts by an RBS trigger event 910. This means that the RBS part wants to start transmission in downlink.

Firstly, it is checked 915 if the TMA part is attached. If the TMA part is not attached, then the procedure ends 920. This is because if there is no TMA part attached, then it cannot of course be synchronized with the RBS part.

If the TMA part is attached, the time offset is configured 930. This is performed as described above.

Then the power amplifier in the amplifier unit of the RBS part is switched on and it is checked 935 if the downlink switch signal at the RBS part works. If it does not work, the procedure ends 940. On the other hand, if the downlink switch signal at the RBS part works, it is checked 945 if a synchronization channel between the RBS modem and the TMA modem is in the ready status. This may be done by handshake signaling at the synchronization channel using the RBS modem and the TMA modem. Both the TMA part and the RBS part are provided with hardware monitors in order to detect the status of the TMA part and the RBS part respectively. When it is detected that the status of both the TMA part and the RBS part is ready, then the synchronization channel is in the ready status.

If it is not in the ready status, the procedure goes back to checking 935 if the downlink switch signal at the RBS part works. If it is in the ready status, then synchronization words may be sent periodically to the TMA modem, and a TMA switch enable command will be sent to the TMA modem to turn on the switch in the TMA part. It should be noted that synchronization words are switch command words which are stored in respective registers of the TMA modem and the RBS modem in the same manner as the switch command words.

Two examples of possible fault scenarios which may occur will now be described. Firstly, the circulator 133 in FIG. 1 may malfunction. When the base station subsystem transmits in downlink, the circulator 133 couples the transmit path 131 to the antenna. Optimally, no power then flows in the receive path 132. In case the circulator 131 malfunctions causing downlink signal power being reflected such that all or part of the power flows in the receive path 132 towards the switch 134 and the LNA 135. One possible way to avoid destruction of the LNA is to route the downlink power in the receive path to the load resistor 136 and also to bypass the LNA 135 in the TMA part. Also a VSWR (Voltage Standing Wave Ratio) or power detector could also be arranged to detect the downlink leakage power and route it to load resistor 136 and bypass the LNA in order to prevent saturation of or damage to the LNA.

Figure 10:
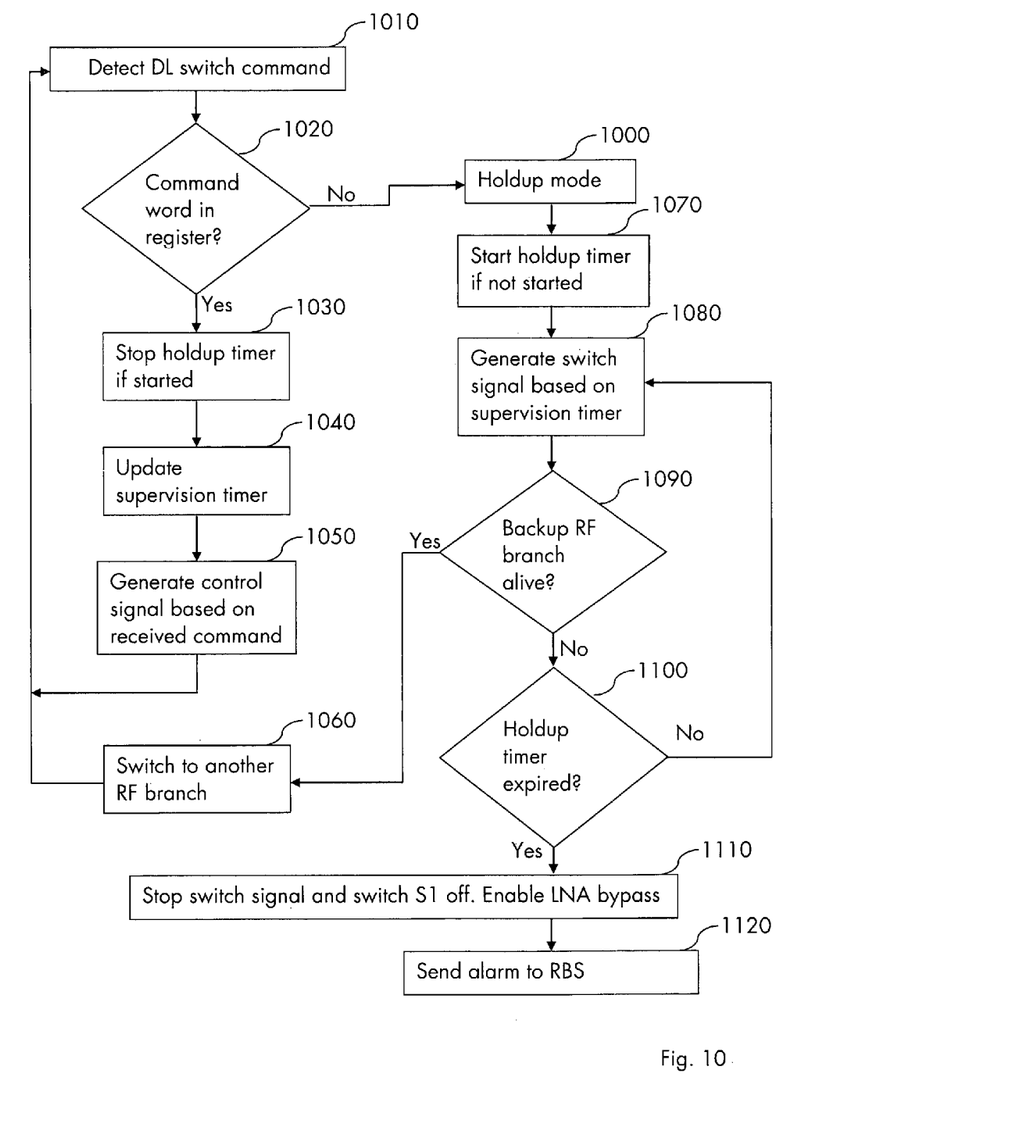
FIG. 10 is a flowchart of an exemplifying fault scenario, in which the timing signal is lost.

Another example of a possible fault scenario is if the switch command word in the switch signal does not match any of the switch command words of the register in the TMA modem. In such a case, the TMA modem enters a holdup mode. This is also illustrated in FIG. 10.

When the TMA modem enters the holdup mode, it needs to provide an accurate switch signal in order to control the switch in the TMA part. When the TMA modem enters the holdup mode 1000, it starts a holdup timer 1070 if it has not already been started and generates a switch signal based on a supervision timer 1080.

At normal operation mode, a supervision timer is arranged at the FPGA of the TMA modem to count the duration of two consecutive downlink switch commands sent from the RBS modem. The supervision timer could have an operation frequency of hundreds of MHz in order to increase the accuracy.

In an example, a PLL (Phase Locked Loop) at the TMA modem is only locked to a local VCXO (Voltage Controlled Crystal Oscillator) and not locked to the periodical downlink command signal. The supervision timer value will be counted differently due to a frequency wander of the VCXO. The VCXO is a part of the TMA modem and controls the NCO1 and NCO2.

When the downlink switch command is lost as just described, the TMA modem enters a so called holdup mode.

At the holdup mode, the FPGA may continue to provide the switch signal to the switch based on the supervision timer value counted last time when a downlink switch command was received. However, due to the frequency wander of the VCXO, the phase of the generated switch signal will wander slowly and eventually exceed a threshold required for phase accuracy within a predefined time. This predefined time, also called holdup time, may be calculated based on required accuracy and the specifications of the VCXO. During the holdup time, another timer may be started to count down based on the calculated holdup time. The switch of the TMA part will be switched off, corresponding to downlink transmission as explained above, which results in the LNA being bypassed after the holdup time has expired.

In yet an example, the PLL at the TMA modem may be locked to the generated switch signal when the downlink switch command is present and then enter the holdup mode after the downlink switch command is lost. The holdup time depending on the VCXO frequency stability characteristics.

If there are more than one RF branch at the TMA part, the TMA modem may switch to another RF branch 1060 in order to detect the switch command which is sent from the RBS modem, if such a branch is alive 1090.

If the holdup timer expires 1100, the TMA will be switched off and the LNA will be bypassed 1110 and an alarm will be generated and sent to the RBS modem 1120.

FIG. 10 also illustrates that a switch signal comprising a switch command word is received 1010 from the RBS modem and the TMA modem checks 1020 if the received switch command word matches any switch command words in its register. If a matching switch command word is found in the register, the holdup timer is stopped 1030 and the supervision timer is updated 1040 and a control signal is generated 1050 in order to control the switch and go back to normal operation mode as has been previously described.

Figure 11:
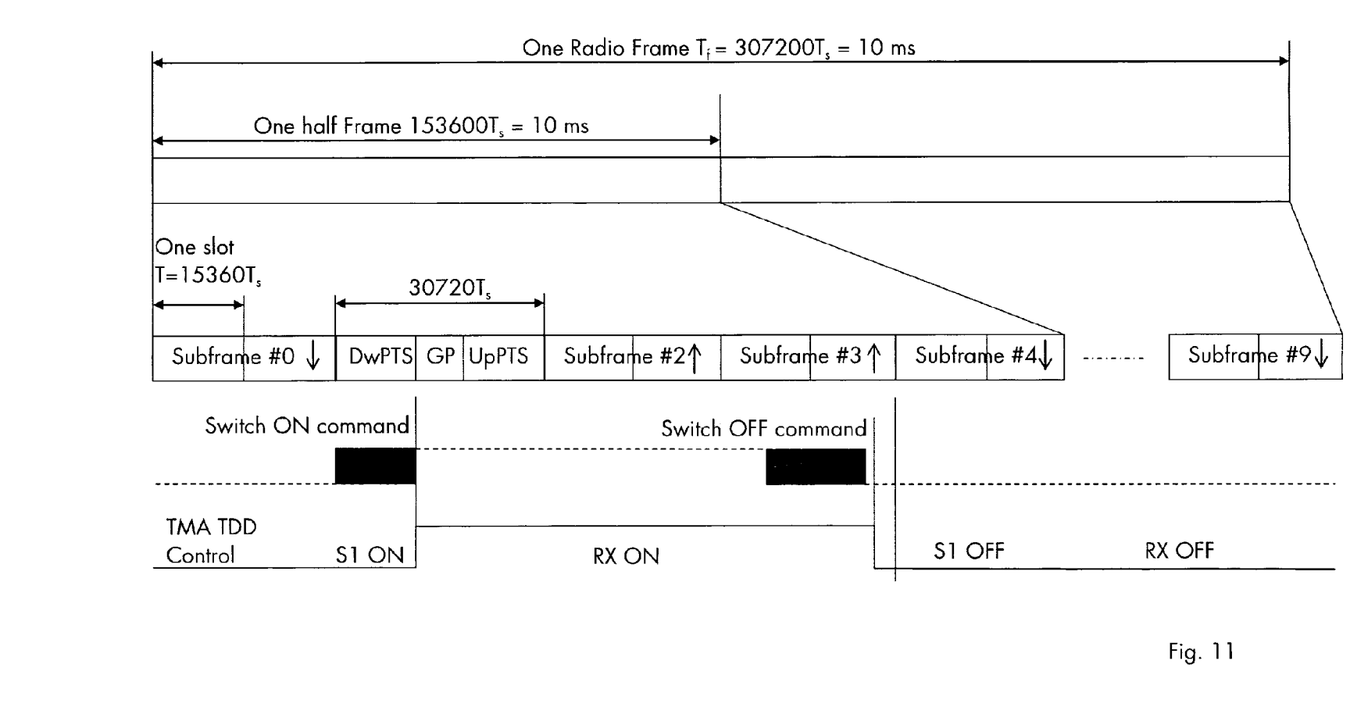
FIG. 11 illustrates an exemplary application of switch command suitable for use in TDD LTE-based system using radio frames.

FIG. 11 illustrates an exemplifying application of the exemplary embodiments of the present invention for a radio frame used in TDD-LTE having sub frames 0 to 9. In this example, the radio frame has two uplink sub frames and is as defined in TDD-LTE. As shown, the RX circuit of TDD TMA is strictly aligned with the radio frame. The control of TMA TDD is illustrated by S1 ON (i.e. Switch ON) followed by RX ON and S1 OFF (i.e. Switch Off) and RX Off. Note that the exemplary embodiments of the present invention are not restricted to TDD-LTE based systems but may also be implemented in other TDD-based systems.

It should be noted that FIGS. 1, 3, 7 and 8 merely illustrates various functional units in the base station subsystem, the TMA part, the RBS part, the TMA modem and the TMA modem in a logical sense. The functions in practice may be implemented using any suitable software and hardware means/circuits etc. Thus, the invention is generally not limited to the shown structures of the base station subsystem, the TMA part, the RBS part, the TMA modem and the TMA modem and the functional units. Hence, the previously described exemplary embodiments may be realised in many ways. For example, one embodiment of the present invention includes a computer-readable medium having instructions stored thereon that are executable by the base station subsystem and/or the RBS part and/or the TMA for synchronizing the RBS part with the TMA part. The instructions executable by the computing system and stored on the computer-readable medium perform the method steps of the present invention as set forth in the claims.

While the invention has been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the present invention and defined by the pending claims.

The invention claimed is:

1. A base station subsystem of a communication system employing Time Division Duplex (TDD) for synchronizing a Radio Base Station (RBS) part of the base station subsystem with a Tower Mounted Amplifier (TMA) part of the base station subsystem, the base station subsystem comprising:
   the RBS part, the RBS part comprising an RBS modem, a timing unit, and an amplifier unit having a power amplifier;
   the TMA part, the TMA part comprising a TMA modem, a switch, and a low noise amplifier;
   wherein the RBS modem is configured to:
      generate a switch signal comprising a switch command word; and
      send the switch signal to the TMA modem;
   wherein the timing unit is configured to activate the power amplifier and simultaneously control the RBS modem to send the switch signal to the TMA modem to configure the switch; and
   wherein the TMA modem is configured to:
      demodulate the switch signal;
      compare a switch command word of the demodulated switch signal with switch command words stored in a register of the TMA part; and
      generate, in response to any of the switch command words in the register matching the switch command word of the demodulated switch signal, a control signal for configuring the switch to couple an antenna to a resistor so that the low noise amplifier is protected from a leakage signal from a transmission path of the TMA part during a transmission period.

2. The base station subsystem of claim 1, wherein the timing unit is configured to inactivate the power amplifier and simultaneously control the RBS modem to send a switch signal to the TMA modem to configure the switch to couple an antenna with the low noise amplifier.

3. The base station subsystem of claim 1, wherein the RBS modem comprises a processor configured to delay the switch signal by a time offset, before sending the switch signal towards the TMA modem, in order to compensate for the time difference between a propagation delay in a transmission from the power amplifier to an output port of the TMA part and a propagation delay in the transmission of the switch signal from the RBS Modem to the TMA Modem.

4. The base station subsystem of claim 1:
wherein the TMA modem is configured to control a supervision timer and a holdup timer; and
wherein the TMA modem is configured to update the supervision timer and reset the holdup timer in response to any of the switch command words in the register matching the switch command word of the demodulated switch signal.

5. The base station subsystem of claim 4, wherein the TMA modem is configured to control the switch via the supervision timer and to start the holdup timer in response to none of the switch command words in the register matching the switch command word of the demodulated switch signal.

6. The base station subsystem of claim 5 wherein the TMA modem is configured to control the switch via the supervision timer until either:
the holdup timer expires, wherein the TMA modem is configured to send an alarm to the RBS modem; or
switch signal is received comprising a switch command word matching any of the switch command words in the register, wherein the TMA modem is configured to generate the control signal and to update the supervision timer and reset the holdup timer.

7. The method of claim 1, wherein the leakage signal is from the transmission path to a receive path of the TMA part using a circulator of the TMA part.

8. A Tower Mounted Amplifier (TMA) part of a base station subsystem for synchronizing the TMA part with a Radio Base Station (RBS) part of the base station subsystem, the TMA part comprising:
a switch;
a low noise amplifier;
a TMA modem configured to receive a switch signal, from an RBS modem in the RBS part, the switch signal comprising a switch command word, wherein a power amplifier of the RBS part is activated simultaneous with the RBS modem being controlled to send the switch signal;
the TMA modem further configured to:
demodulate the switch signal; and
compare the switch command word of the demodulated switch signal with switch command words stored in a register of the TMA part; and
generate, in response to any of the switch command words in the register matching the switch command word of the demodulated switch signal, a control signal for configuring the switch to couple an antenna to a resistor so that the low noise amplifier is protected from a leakage signal from a transmission path of the TMA part during a transmission period.

9. A TMA part of claim 8, wherein the TMA modem is configured to:
control a supervision timer and a holdup timer;
update the supervision timer and reset the holdup timer in response to any of the switch command words in the register matching the switch command word of the demodulated switch signal.

10. A TMA part of claim 9, wherein the TMA modem is configured to:
control the switch via the supervision timer; and
start the holdup timer in response to none of the switch command words in the register matching the switch command word of the demodulated switch signal.

11. A TMA part of claim 10, wherein the TMA modem is configured to control the switch via the supervision timer until either:
the holdup timer expires, wherein the TMA modem is configured to send an alarm to the RBS modem; or
a switch signal is received comprising a switch command word matching any of the switch command words in the register, wherein the TMA modem is configured to generate the control signal and to update the supervision timer and reset the holdup timer.

12. A Radio Base Station (RBS) part of a base station subsystem for synchronizing a Tower Mounted Amplifier (TMA) part of the base station subsystem with the RBS part, the RBS part comprising:
an amplifier unit having a power amplifier;
an RBS modem configured to:
generate a switch signal comprising a switch command word; and
send the switch signal to a TMA modem of the TMA part, wherein the TMA modem demodulates the switch signal and compares the switch command word of the demodulated switch signal with switch command words stored in a register of the TMA part; and
a timing unit configured to control the RBS modem and to control the power amplifier, wherein the timing unit is configured to activate the power amplifier and simultaneously control the RBS modem to send the switch signal to the TMA modem to configure the switch to couple an antenna to a resistor so that a low noise amplifier of the TMA part is protected from a leakage signal from a transmission path of the TMA part during a transmission period.

13. An RBS part of claim 12, wherein the timing unit is configured to inactivate the power amplifier and simultaneously control the RBS modem to send the switch signal to the TMA modem to configure the switch to couple the antenna to the low noise amplifier.

14. An RBS part of claim 12, wherein the RBS modem comprises a processor configured to delay the switch signal by a time offset, before sending it towards the TMA modem in order to compensate for the time difference between the propagation delay in the transmission from the power amplifier to an output port of the TMA part and the propagation delay in the transmission of the switch signal from the RBS Modem to the TMA Modem.

15. A method in a base station subsystem of a communication system employing Time Division Duplex (TDD) for synchronizing a Radio Base Station (RBS) part of the base station subsystem with a Tower Mounted Amplifier (TMA) part of the base station subsystem, the method comprising:
generating a switch signal in an RBS modem of the RBS part, the switch signal comprising a switch command word;
sending, by the RBS modem, the switch signal to a TMA modem of the TMA part, wherein a power amplifier of the RBS part is activated simultaneous with the RBS modem being controlled to send the switch signal;
receiving the switch signal in the TMA modem;
demodulating the switch signal; and
comparing the switch command word of the demodulated switch signal with switch command words stored in a register of the TMA part; and generating, in response to any of the switch command words in the register matching the switch command word of the demodulated switch signal, a control signal in the TMA modem for configuring a switch of the TMA part to couple an antenna to a resistor so that a low noise amplifier of the TMA part is protected from a leakage signal from a transmission path of the TMA part during a transmission period.

16. A method in a Tower Mounted Amplifier (TMA) part of a base station subsystem for synchronizing the TMA part with a Radio Base Station (RBS) part of the base station subsystem, the method comprising:

receiving a switch signal from an RBS modem in the RBS part, the switch signal comprising a switch command word, wherein a power amplifier of the RBS part is activated simultaneous with the RBS modem being controlled to send the switch signal;

demodulating the switch signal;

comparing the switch command word of the demodulated switch signal with switch command words stored in a register of the TMA part; and generating, in the TMA modem and in response to any of the switch command words in the register matching the switch command word of the demodulated switch signal, a control signal for configuring a switch of the TMA part to couple an antenna to a resistor so that a low noise amplifier of the TMA part is protected from a leakage signal from a transmission path of the TMA part during a transmission period.

17. A method in a Radio Base Station (RBS) part of a base station subsystem for synchronizing a Tower Mounted Amplifier (TMA) part of the base station subsystem with the RBS part, the method comprising:

generating, in an RBS modem in the RBS part, a switch signal comprising a switch command word;

sending, from the RBS part, the switch signal to a TMA modem of the TMA part, wherein the TMA modem demodulates the switch signal and compares the switch command word of the demodulated switch signal with switch command words stored in a register of the TMA part;

controlling, by a timing unit of the RBS part, the RBS modem and a power amplifier in an amplifier unit in the RBS part; and wherein the power amplifier is activated by the timing unit, and wherein the RBS modem is simultaneously controlled by the timing unit to send the switch signal to the TMA modem to configure a switch to couple an antenna to a resistor so that a low noise amplifier of the TMA part is protected from a leakage signal from a transmission path of the TMA part during a transmission period.

* * * * *